(12) United States Patent
Phillips

(10) Patent No.: US 11,484,831 B1
(45) Date of Patent: Nov. 1, 2022

(54) DIRECT AIR CAPTURE SYSTEM REMOVING CARBON DIOXIDE

(71) Applicant: Eric Phillips, Westminster, CO (US)

(72) Inventor: Eric Phillips, Westminster, CO (US)

( * ) Notice: Subject to any disclaimer, the term of this patent is extended or adjusted under 35 U.S.C. 154(b) by 0 days.

(21) Appl. No.: 17/405,950

(22) Filed: Aug. 18, 2021

(51) Int. Cl.
*B01D 53/62* (2006.01)
*B01D 53/78* (2006.01)

(52) U.S. Cl.
CPC ............ *B01D 53/62* (2013.01); *B01D 53/78* (2013.01); *B01D 2251/602* (2013.01); *B01D 2251/604* (2013.01); *B01D 2257/504* (2013.01); *B01D 2258/06* (2013.01)

(58) Field of Classification Search
CPC ... A61L 9/00; A61L 9/14; A61L 9/145; A61L 9/032; B01D 53/62; B01D 53/78; B01D 2251/602; B01D 2258/06; B01D 2251/604; B01D 2257/504
See application file for complete search history.

(56) References Cited

U.S. PATENT DOCUMENTS

| | | | | |
|---|---|---|---|---|
| 2013/0336722 A1* | 12/2013 | Wright | .................. | B01D 71/82 423/437.1 |
| 2014/0130670 A1* | 5/2014 | Eisenberger | .............. | B65C 5/00 95/139 |
| 2022/0176312 A1* | 6/2022 | Olmstead | ................. | B01J 19/32 |

FOREIGN PATENT DOCUMENTS

| | | | | | |
|---|---|---|---|---|---|
| CN | 103 827 037 A | * | 5/2014 | ............. | C01D 7/26 |
| GB | 2 547 696 A | * | 8/2017 | ............. | B01D 53/62 |
| WO | WO 2011 122 925 A1 | * | 10/2011 | ............. | B01D 53/18 |
| WO | WO 2015 194 963 A1 | * | 12/2015 | ............. | C25B 15/08 |
| WO | WO 2017 004 712 A1 | * | 1/2017 | ............. | B01D 53/14 |

* cited by examiner

*Primary Examiner* — Timothy C Vanoy
(74) *Attorney, Agent, or Firm* — Donald R. Boys; Central Coast Patent Agency LC

(57) ABSTRACT

A direct air capture (DAC) system for removal of carbon dioxide from ambient air has a reaction chamber having an air intake opening and an air exhaust opening, an air movement mechanism positioned to move air from outside through the reaction chamber, utilizing the air intake and the air exhaust openings, and a mechanism introducing sodium hydroxide into the reaction chamber. Carbon dioxide in the air moved through the reaction chamber interacts chemically with the sodium hydroxide, producing sodium carbonate and water.

12 Claims, 3 Drawing Sheets

DIRECT AIR CAPTURE SYSTEM REMOVING CARBON DIOXIDE

BACKGROUND OF THE INVENTION

1. Field of the Invention

The instant invention is in the technology area of removing Carbon Dioxide from ambient air.

2. Description of Related Art

It is well known that industrially produced carbon dioxide [$CO_2$] is the most direct cause of the Earth's current warming trend and resulting potentially catastrophic climate change. Many climate action plans, including the Paris Accord, predict that to limit global temperature rise to no more than 2.5 deg C., some type of carbon capture system must be widely implemented to reduce carbon that has already accumulated in the atmosphere.

The most common conventional method for capturing carbon dioxide from ambient air is Direct Air Capture (DAC), which utilizes calcium hydroxide [$Ca(OH)_2$] to capture $CO_2$, resulting in calcium carbonate [$CaCO_3$]. A serious disadvantage of this method is a requirement for applying a high level of heat energy to remove the $CO_2$ from the resulting calcium carbonate [$CaCO_3$], restoring the main ingredient, $Ca(OH)_2$. An additional disadvantage of this method is that the main byproduct of the capture cycle is $CO_2$, which must be sequestered via an additional method (such as underground mineral injection).

What is clearly needed is a technique that overcomes the existing DAC disadvantages and provides a simple and economical method of capturing and storing the captured carbon dioxide.

BRIEF SUMMARY OF THE INVENTION

In an embodiment of the invention a direct air capture (DAC) system for removal of carbon dioxide from ambient air is provided, comprising a reaction chamber having an air intake opening and an air exhaust opening, an air movement mechanism positioned to move air from outside through the reaction chamber, utilizing the air intake and the air exhaust openings, and a mechanism introducing sodium hydroxide into the reaction chamber. Carbon dioxide in the air moved through the reaction chamber interacts chemically with the sodium hydroxide, producing sodium carbonate and water.

In one embodiment the system further comprises a mechanism heating the sodium hydroxide. Also, in one embodiment the sodium hydroxide is heated to a temperature of about 49 degrees Celsius. Also, in one embodiment the mechanism introducing sodium hydroxide is a permeable membrane impregnated with sodium hydroxide and suspended in the reaction chamber. And in one embodiment the system further comprises a heating element proximate the membrane by which the membrane and its content are heated.

In one embodiment the sodium hydroxide is heated to a temperature of about 49 degrees Celsius. Also, in one embodiment the mechanism introducing sodium hydroxide is a misting apparatus drawing sodium hydroxide from an outside source, and introducing the sodium hydroxide into the reaction chamber as a mist. In one embodiment the system further comprises a heating element proximate the outside source of sodium hydroxide, heating the sodium hydroxide prior to introducing the sodium hydroxide as a mist. And in one embodiment the sodium hydroxide is heated to a temperature of about 49 degrees Celsius.

In another aspect of the invention a method for direct air capture (DAC) for removal of carbon dioxide from ambient air is provided, comprising introducing a quantity of sodium hydroxide into a reaction chamber having an air intake opening, an air exhaust opening, and an air movement mechanism positioned to move air from outside through the reaction chamber, utilizing the air intake and the air exhaust openings, and operating the air movement mechanism for a period of time, moving ambient air through the reaction chamber into contact with the quantity of sodium hydroxide, wherein carbon dioxide in the air moved through the reaction chamber interacts chemically with the sodium hydroxide, producing sodium carbonate and water.

In one embodiment the method further comprises a step operating a mechanism heating the sodium hydroxide during a period with air passing over the sodium hydroxide. Also, in one embodiment the method further comprises a step removing sodium carbonate from the reaction chamber and mixing the sodium carbonate with soluble magnesium chloride, producing magnesium carbonate and sodium chloride brine in a slurry. And in one embodiment the method further comprises a step washing the slurry, increasing purity of the magnesium carbonate.

In one embodiment the method further comprises a step boiling the magnesium carbonate in a dilute solution of sodium carbonate and washing again, then drying, producing a saleable product of magnesium carbonate. In one embodiment the method comprises for steps collecting the brine, evaporating it to sodium chloride salt. In one embodiment the method comprises preparing a sodium chloride solution and utilizing electrolysis to create sodium hydroxide in solution. And in one embodiment the method comprises dehydrating the sodium hydroxide solution and introducing to the reaction chamber to react with carbon dioxide in air moved through the reaction chamber.

DETAILED DESCRIPTION OF THE INVENTION

In one embodiment of the invention the direct air capture properties of sodium hydroxide are used to capture carbon dioxide from ambient air. A result of this process is sodium carbonate, which is paired with magnesium chloride in a double displacement reaction to precipitate magnesium carbonate. A resulting byproduct, sodium chloride brine solution, is then used to synthesize the base ingredient, sodium hydroxide, through electrolysis. The process in this embodiment of the invention is a closed-loop system with only chlorine and hydrogen gas as byproducts. The chlorine and hydrogen gases can be captured to be repurposed elsewhere.

The instant invention in one embodiment is a process for direct air carbon capture and storage utilizing the carbon capture properties of sodium hydroxide. In this embodiment the resulting mineralized carbon dioxide is captured in magnesium carbonate. The magnesium carbonate product may be utilized for rock climbing and other sport applications and the sales of which may fund further capture and sequestration of carbon dioxide.

Figure 1:
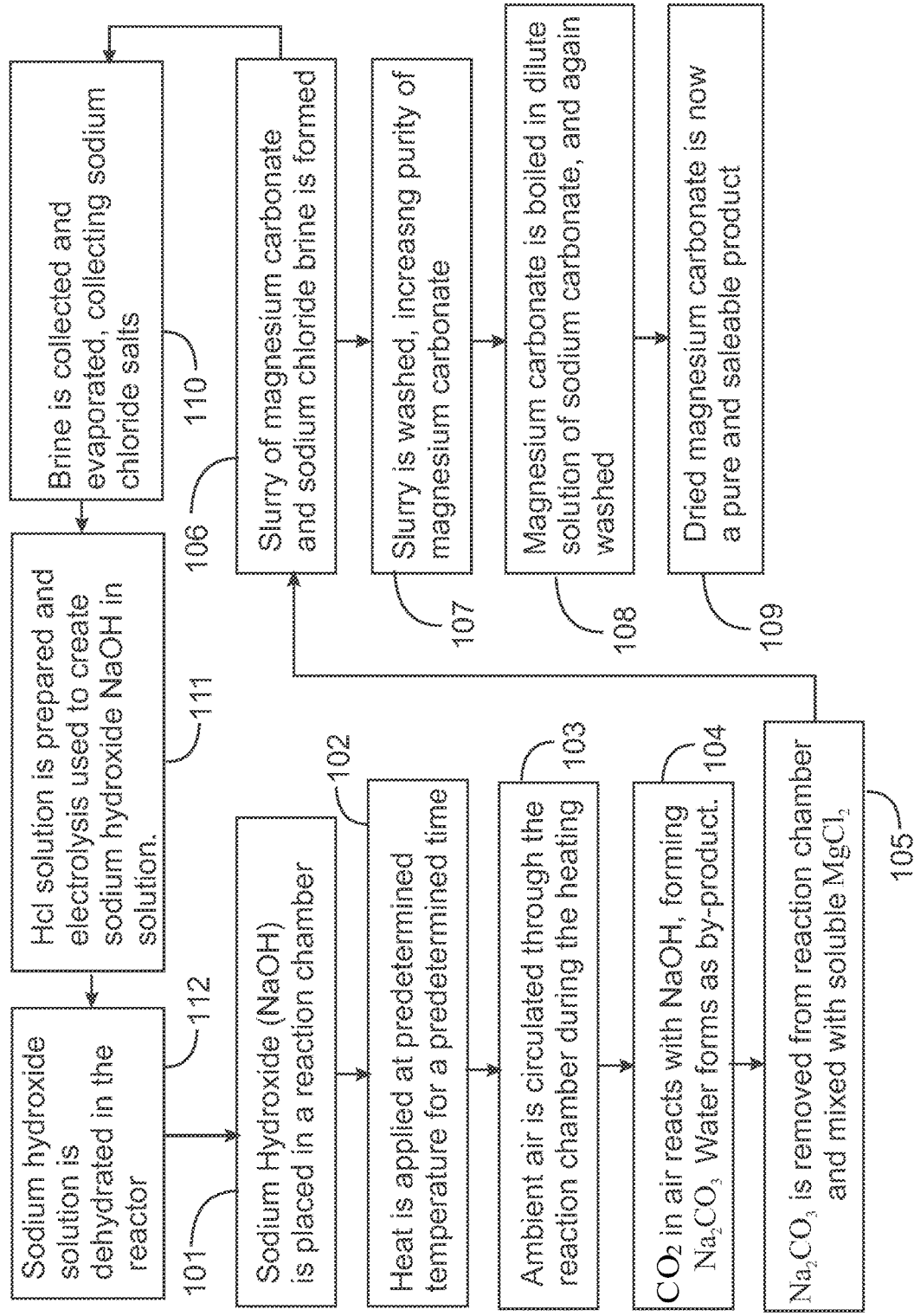
FIG. 1 is a flow diagram of a closed-loop process for capturing and storing $CO_2$ in magnesium carbonate utilizing direct air capture (DAC) in an embodiment of the invention.

FIG. 1 is a flow chart depicting a process according to an embodiment of the instant invention. At step 101 Sodium Hydroxide (NaOH) is placed in a reaction chamber that may take one of several forms, described in enabling detail below. At step 102 the NaOH is heated for a predetermined time. In one embodiment the temperature is about 49 degrees Celsius (C), which equates to about 120 degrees Fahrenheit (F), and the time is 96 hours. In various embodiments the temperature may vary somewhat, and the time may vary considerably.

During the predetermined time, at step 103, ambient air, which may contain 420 to 600 ppm carbon dioxide, depending on location, is continuously circulated through the reaction chamber. The heating ensures that nitrogen in the air does not react with the sodium hydroxide to form contaminating sodium nitrite. The result in step 104 is over 95% pure sodium carbonate, $Na_2Co_3$. Water is a by-product.

At step 105 the sodium carbonate is removed from the reaction chamber. The reaction chamber may be cleaned and reconditioned to be re-used. The sodium carbonate removed is mixed with soluble magnesium chloride. The sodium carbonate and magnesium chloride are mixed at room temperature (approximately 20-30 degrees C.) in solutions that may be heated to about 50 degrees C. to increase solubility of the salts.

During mixing a precipitate of magnesium carbonate will form at step 106 $[MgCl_2(aq)+Na_2CO_3(aq) \rightarrow MgCO_3(s)+ 2NaCl(aq)]$ as a slurry. The slurry is stirred until a pH of less than 8 is achieved, which pH may be determined by a phenalphalactyn indicator. At step 107 the slurry of magnesium carbonate and sodium chloride brine is then washed to attain a purity of approximately 70%.

At step 108 the magnesium carbonate is then further purified by boiling in a dilute solution of sodium carbonate. This allows less soluble double-salts of sodium magnesium chloride to break their bonds, and the salts are washed out after boiling is completed. Boiling is determined to be completed after slurry reaches a temperature of about 165 degrees C. to ensure removal of any crystalline hydrates.

At step 109 the resulting magnesium carbonate, now over 90% pure, is dried and is a final, saleable product. The resulting synthesized magnesium carbonate is high-quality, and suitable for applications such as gymnastics or climbing chalk. The final product can be sold, which will fund operations to continue to remove carbon dioxide from the atmosphere. The resulting magnesium carbonate is synthetic from sustainably sourced inputs, preferable to magnesite mineral $MgCO_3$, which is removed from large-scale strip-mines, often in countries with little safety or environmental regulation. By utilizing this unique method of direct air carbon capture and storage, carbon dioxide is mineralized and stored indefinitely as magnesium carbonate.

The byproduct of the reaction in step 106 is sodium chloride brine, with traces of unreacted sodium carbonate and magnesium chloride. At step 110 This brine is collected, and the brine solution is evaporated to collect the sodium chloride salts. At step 111 a solution of about 80% sodium chloride is prepared in one embodiment and, utilizing electrolysis, is treated with 1.5 A/12V DC current to refresh the main DAC reactant, sodium hydroxide. At step 112 this solution is then dehydrated in the reactor, creating a closed-loop process that allows the sodium hydroxide to be reutilized for additional cycles of direct air capture.

In a preferred embodiment all steps of the process utilize renewable energy for capture and storage, so none of the CO2 captured is released as part of the process. In the operation of the invention 50 g samples of sodium hydroxide yield 67 g of sodium carbonate. It is noted as well that sodium hydroxide can absorb 75.8% of its own weight in carbon dioxide.

By-products of the electrolysis process to refresh sodium hydroxide are chlorine and hydrogen gases. These are valuable gases that can be sold as well as the primary product, magnesium carbonate.

Figure 2:
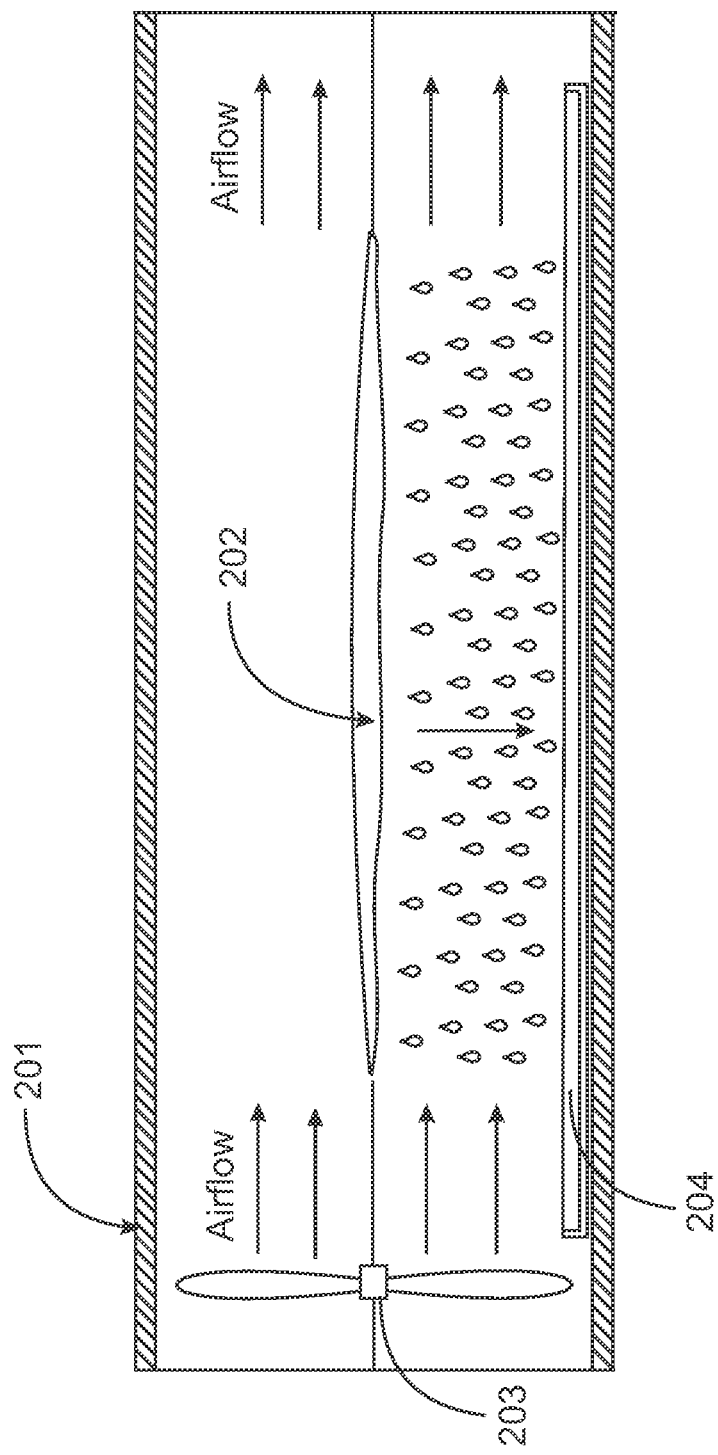
FIG. 2 is a diagram of a reaction chamber that might be used in one embodiment of the invention.

FIG. 2 is a diagram of a reaction chamber that might be used in one embodiment of the invention. In FIG. 2 reaction chamber 201 approximates a wind tunnel producing an airflow in one direction by at least one fan 203. A permeable membrane 202 is impregnated with sodium hydroxide. The membrane may have heating elements (not shown) by which the membrane and its content may be heated. Sodium carbonate is formed in the membrane and the water produced as a by-product falls into a pan 204, along with a portion of the sodium carbonate formed. At the end of a cycle the membrane may be removed, removing in the act the sodium carbonate. After water is evaporated in this system, about half of the sodium carbonate will be in the pan, and this portion of the sodium carbonate may be removed from the pan. The balance of a production cycle proceeds as described in FIG. 1 from step 105.

Figure 3:
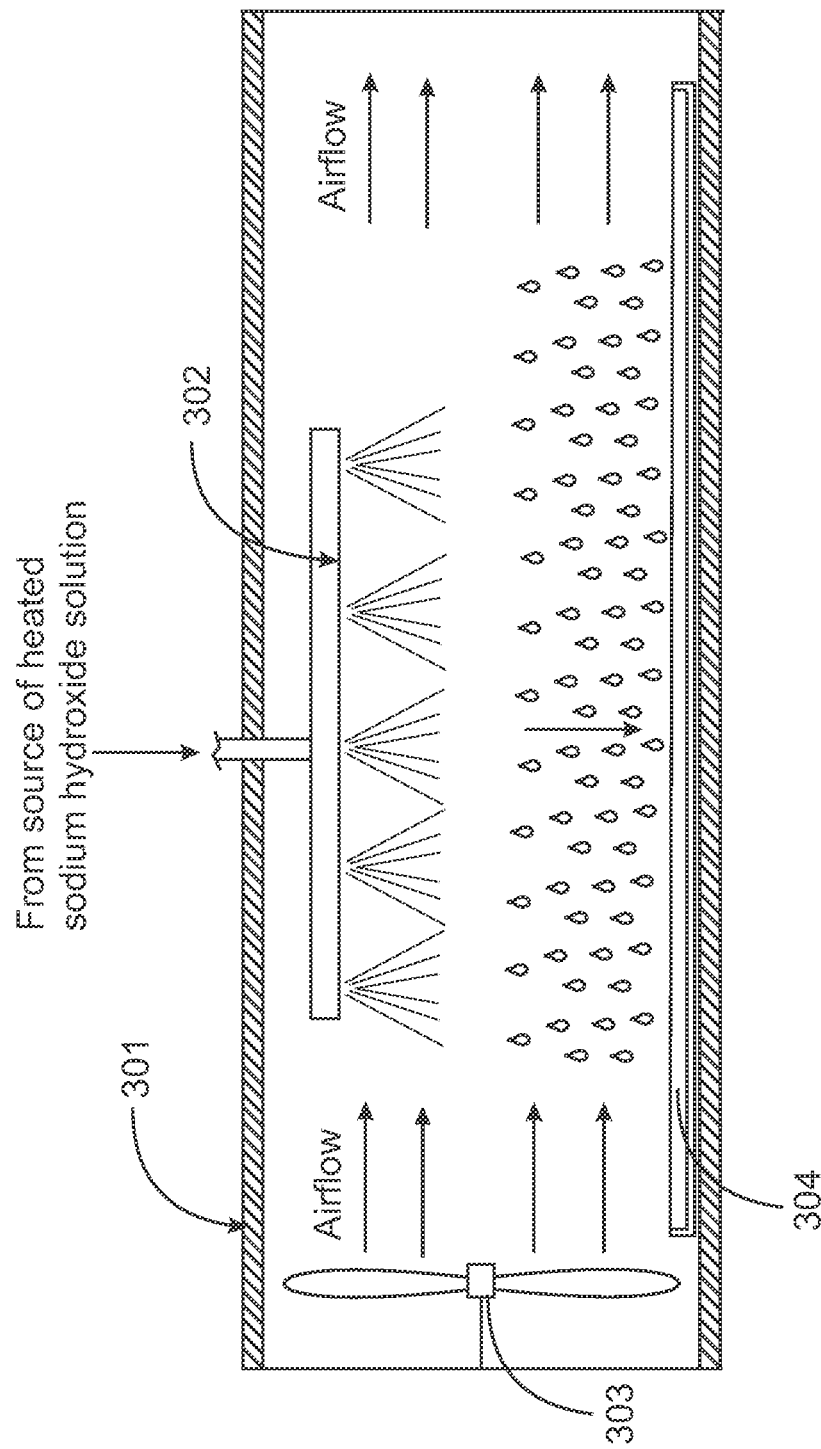
FIG. 3 is a diagram of an alternative reaction chamber that might be used in one embodiment of the invention.

FIG. 3 is a diagram of an alternative reaction chamber that might be used in an embodiment of the invention. In FIG. 3 reaction chamber 301 has at least one misting head 302 through which a solution of sodium hydroxide may be introduced as an aerosol mist. There may be a plurality of misting heads drawing solution from a common source. As air with ambient $CO_2$ flows through the chamber, urged by one or more fans 303, $CO_2$ reacts with the sodium hydroxide in the mist forming sodium carbonate and water, which both fall into pan 304. The sodium hydroxide solution forming the mist may be heated by apparatus not shown.

The sodium carbonate formed may be separated from the water in pan 304, in one instance by evaporating the water, and the balance of the process proceeds substantially as taught from the description of FIG. 1 from step 105.

The skilled person will understand that the embodiments and details described are entirely exemplary, and that many alterations may be made within the scope of the invention. It is understood particularly that the proportions given above and also the time and temperatures can be varied within fairly wide limits to obtain desired results. The scope of the invention is limited only by the claims.

The invention claimed is:

1. A direct air capture (DAC) system for removal of carbon dioxide from ambient air, comprising:
   a reaction chamber having an air intake opening and an air exhaust opening;
   an air movement mechanism positioned to move air from outside through the reaction chamber, utilizing the air intake and the air exhaust openings;
   a mechanism introducing sodium hydroxide into the reaction chamber; and
   a mechanism heating the sodium hydroxide to a temperature of about 49 degrees Celsius;
   characterized in that carbon dioxide in the air moved through the reaction chamber interacts chemically with the sodium hydroxide, producing sodium carbonate and water.

2. A direct air capture (DAC) system for removal of carbon dioxide from ambient air, comprising:

a reaction chamber having an air intake opening and an air exhaust opening;

an air movement mechanism positioned to move air from outside through the reaction chamber, utilizing the air intake and the air exhaust openings;

a permeable membrane impregnated with sodium hydroxide and suspended in the reaction chamber; and a heating element proximate the membrane by which the membrane and its content are heated.

3. The system of claim 2 wherein the sodium hydroxide is heated to a temperature of about 49 degrees Celsius.

4. A direct air capture (DAC) system for removal of carbon dioxide from ambient air, comprising:

a reaction chamber having an air intake opening and an air exhaust opening;

an air movement mechanism positioned to move air from outside through the reaction chamber, utilizing the air intake and the air exhaust openings; and a misting apparatus drawing sodium hydroxide from an outside source, and introducing the sodium hydroxide into the reaction chamber as a mist; and a heating element proximate the outside source of sodium hydroxide, heating the sodium hydroxide prior to introducing the sodium hydroxide as a mist;

characterized in that carbon dioxide in the air moved through the reaction chamber interacts chemically with the sodium hydroxide, producing sodium carbonate and water.

5. The system of claim 4 wherein the sodium hydroxide is heated to a temperature of about 49 degrees Celsius.

6. A method for direct air capture (DAC) for removal of carbon dioxide from ambient air, comprising:

introducing a quantity of sodium hydroxide into a reaction chamber having an air intake opening, an air exhaust opening, and an air movement mechanism positioned to move air from outside through the reaction chamber, utilizing the air intake and the air exhaust openings;

operating a mechanism heating the sodium hydroxide during a period with air passing over the sodium hydroxide; and operating the air movement mechanism for a period of time, moving ambient air through the reaction chamber into contact with the quantity of sodium hydroxide, wherein carbon dioxide in the air moved through the reaction chamber interacts chemically with the sodium hydroxide, producing sodium carbonate and water.

7. The method of claim 6 further comprising a step removing sodium carbonate from the reaction chamber and mixing the sodium carbonate with soluble magnesium chloride, producing magnesium carbonate and sodium chloride brine in a slurry.

8. The method of claim 7 further comprising a step washing the slurry, increasing purity of the magnesium carbonate.

9. The method of step 8 further comprising a step boiling the magnesium carbonate in a dilute solution of sodium carbonate and washing again, then drying, producing a saleable product of magnesium carbonate.

10. The system of claim 7 comprising steps collecting the brine, evaporating to sodium chloride salt.

11. The method of claim 10 comprising preparing a sodium chloride solution and utilizing electrolysis to create sodium hydroxide in solution.

12. The method of claim 11 comprising dehydrating the sodium hydroxide solution and introducing to the reaction chamber to react with carbon dioxide in air moved through the reaction chamber.

\* \* \* \* \*